(12) United States Patent
Mikkonen (10) Patent No.: US 7,853,418 B2
(45) Date of Patent: Dec. 14, 2010

(54) FREQUENCY ERROR ESTIMATION ALGORITHM

(75) Inventor: Jukka Mikkonen, Oulu (FI)

(73) Assignee: Nokia Corporation, Espoo (FI)

( * ) Notice: Subject to any disclaimer, the term of this patent is extended or adjusted under 35 U.S.C. 154(b) by 81 days.

(21) Appl. No.: 11/812,532

(22) Filed: Jun. 19, 2007

(65) Prior Publication Data

US 2008/0262775 A1 Oct. 23, 2008

(30) Foreign Application Priority Data

Apr. 23, 2007 (FI) .................................. 20075282

(51) Int. Cl.
*H04B 7/00* (2006.01)
(52) U.S. Cl. ............................. 702/66; 702/72; 702/75; 702/79; 702/106
(58) Field of Classification Search .................... 702/66, 702/72, 75, 79, 106; 370/314, 318; 375/150
See application file for complete search history.

(56) References Cited

U.S. PATENT DOCUMENTS

| 5,422,917 | A | * | 6/1995 | Scott ........................... 375/371 |
| 6,320,917 | B1 | | 11/2001 | Stott et al. |
| 6,985,516 | B1 | * | 1/2006 | Easton et al. ............... 375/150 |
| 2002/0031189 | A1 | | 3/2002 | Hiben et al. |
| 2002/0065047 | A1 | | 5/2002 | Moose |
| 2003/0081562 | A1 | * | 5/2003 | Iwamatsu et al. .......... 370/314 |
| 2004/0161047 | A1 | | 8/2004 | Liu et al. |

FOREIGN PATENT DOCUMENTS

| GB | 2 422 073 A | 7/2006 |
| WO | WO 2004/042949 A1 | 5/2004 |

OTHER PUBLICATIONS

International Search Report PCT/FI2008/050211 dated Aug. 20, 2008.
Herman, Lo, et al.; "A Study of Non-Uniform Pilot Spacing for PSAM"; 2000; pp. 322-325.

* cited by examiner

*Primary Examiner*—Drew A Dunn
*Assistant Examiner*—Hien X Vo
(74) *Attorney, Agent, or Firm*—Squire, Sanders & Dempsey, LLP (57) ABSTRACT

A frequency error estimation algorithm is presented for use in radio receivers, for example. The present algorithm utilizes irregular time intervals between pilot symbols to improve the frequency range of the estimate. First, a first phase rotation indicator comprising information on phase rotation of a received signal within a first time interval is estimated. Then, a second phase rotation indicator comprising information on phase rotation of the received signal within a second time interval of a different length than the first time interval is estimated. A frequency error estimate is calculated from the phase difference between the first phase rotation indicator and the second phase rotation indicator, for example by dividing the phase difference by the difference in the lengths of the first and the second time interval.

31 Claims, 3 Drawing Sheets

FREQUENCY ERROR ESTIMATION ALGORITHM

FIELD

The invention relates to frequency error estimation in a receiver.

BACKGROUND

In mobile telecommunication systems there always exists frequency offset in a signal transmitted from a radio transmitter to a radio receiver. The frequency offset may be caused by a frequency difference between oscillators of the transmitter and the receiver, but a major cause for the frequency offset is also the Doppler shift affecting the signal in a mobile environment. The Doppler shift is caused by a change in the distance between a mobile terminal and a base station due to the movement of the mobile terminal.

Frequency offsets typically leak to a baseband part of the receiver, thereby causing a phase rotation, i.e. frequency error, in a received baseband signal. This frequency error has to be compensated for in order to ensure a reliable detection of received data. First of all, the frequency error introduced into the received signal is estimated and, thereafter, the phase rotation in the received baseband signal is compensated for by weighting the received signal with estimated phase rotation values which are used for rotating the phase of the received signal to the opposite direction.

A conventional solution for estimating the frequency error is to estimate a phase difference between pilot symbols transmitted at different time instants. Then, a frequency error estimate is obtained by dividing the phase difference between the pilot symbols by a time difference between transmission times of the respective pilot symbols. The estimation is based on the fact that the phase difference within a determined time period represents a frequency offset. In theory, the frequency is a time derivative of a phase.

A conventional solution does not, however, provide a sufficient performance in all applications. As an example, let us consider a current frame structure of a downlink of a UMTS LTE (Universal Mobile Telecommunication System Long-Term Evolution) standardized within the 3GPP ($3^{rd}$ Generation Partnership Project). The downlink of the UMTS LTE system is based on OFDMA (Orthogonal Frequency Division Multiple Access) in which a pilot symbol is transmitted periodically on a given subcarrier. According to the current standard, the pilot symbol is transmitted on the same subcarrier with seven OFDM symbol intervals meaning that every seventh OFDM symbol has a pilot symbol on the same subcarrier. In OFDM systems, the frequency error should be estimated from pilot symbols transmitted on the same subcarrier, since different frequencies, i.e. different subcarriers, have different phasing properties.

According to the conventional frequency error estimation method, the phase difference between a first pilot symbol transmitted on a subcarrier of a first OFDM symbol and a second pilot symbol transmitted on the same subcarrier of another OFDM symbol transmitted 7 OFDM symbols after the first OFDM symbol is estimated. A time difference between the transmissions of the OFDM symbols is 0.5 ms according to the current standard and, therefore, the maximum frequency error which can be detected with the conventional method is ±1 kHz. This range may not be sufficient and calls for improvement. After all, accurate estimation of even large frequency errors is a key factor in providing reliable data transmission in OFDM systems in which subcarriers are allocated very close to each other in a frequency domain.

BRIEF DESCRIPTION OF THE INVENTION

An object of the invention is to provide an improved frequency error estimation algorithm to be utilized in radio receivers, for example.

According to an aspect of the invention, there is provided a method, comprising: estimating a first phase rotation indicator comprising information on phase rotation of a received signal within a first time interval, estimating a second phase rotation indicator comprising information on phase rotation of the received signal within a second time interval of a different length than the first time interval and calculating a frequency error estimate from the phase difference between the first phase rotation indicator and the second phase rotation indicator.

According to another aspect of the invention, there is provided an apparatus comprising an interface to receive a signal. The apparatus further comprises a processing unit configured to estimate a first phase rotation indicator comprising information on phase rotation of the received signal within a first time interval, to estimate a second phase rotation indicator comprising information on phase rotation of the received signal within a second time interval of a different length than the first time interval, and to calculate a frequency error estimate from the phase difference between the first phase rotation indicator and the second phase rotation indicator.

According to another aspect of the invention, there is provided a receiver comprising the above-mentioned apparatus.

According to another aspect of the invention, there is provided an apparatus, comprising: means for estimating a first phase rotation indicator comprising information on phase rotation of a received signal within a first time interval, means for estimating a second phase rotation indicator comprising information on phase rotation of the received signal within a second time interval of a different length than the first time interval, and means for calculating a frequency error estimate from the phase difference between the first phase rotation indicator and the second phase rotation indicator.

According to yet another aspect of the invention, there is provided a computer program product encoding a computer program of instructions for executing a computer process for frequency error estimation. The process comprises estimating a first phase rotation indicator comprising information on phase rotation of a received signal within a first time interval, estimating a second phase rotation indicator comprising information on phase rotation of the received signal within a second time interval of a different length than the first time interval, and calculating a frequency error estimate from the phase difference between the first phase rotation indicator and the second phase rotation indicator.

According to still another aspect of the invention, there is provided a computer program distribution medium readable by a computer and encoding a computer program of instructions for executing a computer process for frequency error estimation. The process comprises estimating a first phase rotation indicator comprising information on phase rotation of a received signal within a first time interval, estimating a second phase rotation indicator comprising information on phase rotation of the received signal within a second time interval of a different length than the first time interval, and calculating a frequency error estimate from the phase difference between the first phase rotation indicator and the second phase rotation indicator.

LIST OF DRAWINGS

In the following, the invention will be described in greater detail with reference to the embodiments and the accompanying drawings, in which.

DESCRIPTION OF EMBODIMENTS

Figure 1:
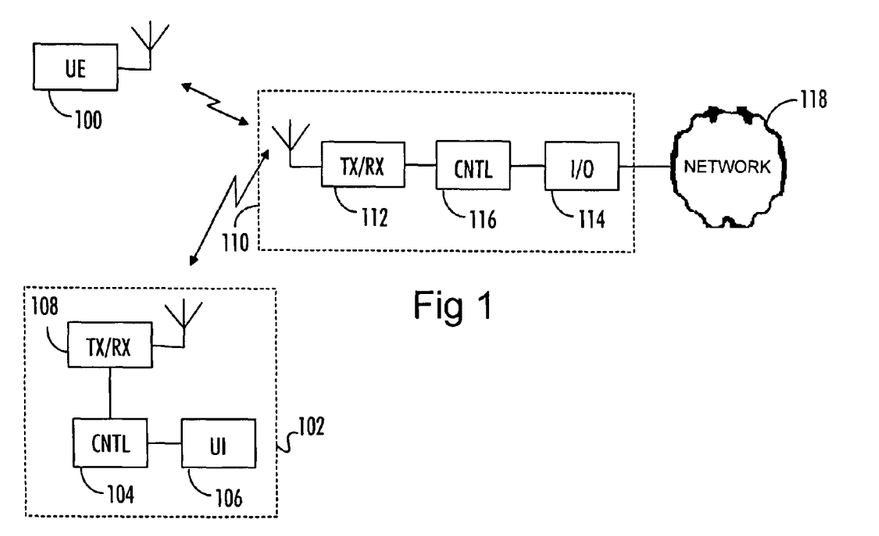
FIG. 1 illustrates an exemplary telecommunication system to which embodiments of the invention may be applied.

With reference to FIG. 1, examine an example of a receiver and a mobile telecommunication system in which embodiments of the invention can be applied. The receiver may be a radio receiver such as a base station 110 or a mobile terminal 102 of the mobile telecommunication system, but embodiments of the invention may also be applied to other receivers. The mobile telecommunication system may be a long-term evolution of a UMTS (Universal Mobile Telecommunication System) standardized by the 3$^{rd}$ Generation Partnership Project. The mobile telecommunication system may utilize orthogonal frequency division multiple access (OFDMA) for downlink communications. Therefore, embodiments of the inventions may also be applied to a WLAN (Wireless Local Area Network) system.

The base station 110 comprises a first communication interface 112 to provide an air interface connection to one or several mobile terminals 100, 102. The first communication interface 112 may comprise a plurality of antennas to enable diversity reception of radio signals. The first communication interface 112 may perform analog operations necessary for transmitting and receiving radio signals. Such operations may comprise analog filtering, amplification, up-/downconversions, and A/D (analog-to-digital) or D/A (digital-to-analog) conversion.

The base station 110 may further comprise a second communication interface 114 to provide a wired connection to the network 118 of the mobile telecommunication system. The network 118 of the mobile telecommunication system may provide connections to other networks, such as the Internet and Public Switched Telephone Network (PSTN), and/or other mobile telecommunication systems.

The base station 110 further comprises a processing unit 116 to control functions of the base station 110. The processing unit 116 handles establishment, operation and termination of radio connections with the mobile subscriber units 100, 102 the base station 110 is serving. The processing unit 116 may also perform signal processing operations to received radio signals. The processing unit 116 may be implemented by a digital signal processor with suitable software embedded in a computer readable medium, or by separate logic circuits, for example with ASIC (Application Specific Integrated Circuit).

The mobile terminal implementing embodiments of the invention may also comprise a communication interface 108 to provide an air interface connection to the base station 110. The communication interface 108 may also comprise a plurality of antennas to enable diversity reception of radio signals. The communication interface 108 may perform analog operations necessary for transmitting and receiving radio signals. Such operations may comprise analog filtering, amplification, up-/down conversions, and A/D (analog-to-digital) or D/A (digital-to-analog) conversion.

The mobile terminal 102 further comprises a processing unit 104 to control functions of the mobile terminal 102. The processing unit 104 handles establishment, operation and termination of radio connections with the base station 110 serving the mobile terminal 102. The processing unit 104 may also perform signal processing operations to received radio signals. The processing unit 104 may be implemented by a digital signal processor with suitable software embedded in a computer readable medium, or by separate logic circuits, for example with ASIC (Application Specific Integrated Circuit).

The mobile terminal 102 may further comprise a user interface 106 to enable interaction with a user of the mobile terminal 102. The user interface 106 may include a display unit, keyboard or keypad, loudspeaker, microphone, etc.

Figure 2:
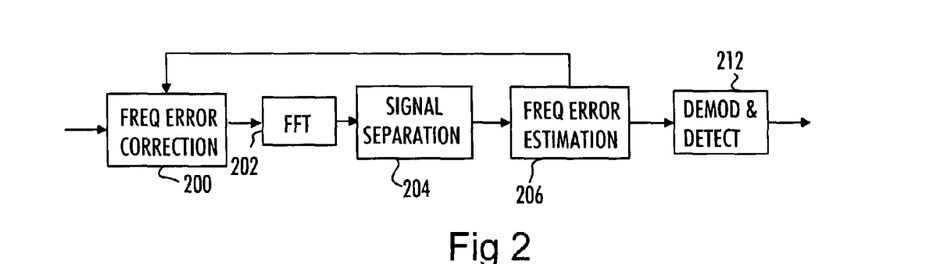
FIG. 2 illustrates a general block diagram of baseband signal processing operations performed in a receiver according to an embodiment of the invention.

Referring to FIG. 2, let us now consider a general block diagram of an OFDM (Orthogonal Frequency Division Multiplexing) receiver utilizing a frequency error estimation algorithm according to an embodiment of the invention. The OFDM receiver may be, for example, the mobile terminal 102 but is not limited to that. The blocks illustrated in FIG. 2 may be implemented in a processing unit of the receiver, i.e. in the processing unit 104.

After A/D conversion of a received OFDM multicarrier signal comprising a plurality of subcarriers, the OFDM signal is fed to a frequency error correction unit 200 for frequency error correction. The frequency error correction unit 200 may carry out the frequency error correction by weighting samples of the received OFDM signal with frequency error correction factors (phase rotation factors) calculated from the frequency error estimates received from a frequency error estimation unit 206, thereby negating the phase rotation caused by the frequency error to the received OFDM signal. The frequency error correction unit 200 may calculate the frequency error correction factors from the received frequency error estimates by calculating complex conjugates of the received frequency error estimates. The weighting may be a multiplication operation in which each data symbol is multiplied by a phase rotation factor to compensate for the frequency error. Since the frequency error correction unit 200 precedes the frequency error estimation unit 206 in this embodiment, frequency error estimates calculated from previously received OFDM symbols may be used for correcting the frequency error in the currently received OFDM symbol.

After the frequency error correction, a time domain frequency-error-corrected OFDM signal is converted into a frequency domain through a fast Fourier transform (FFT) in an FFT block 202. After the FFT, the frequency domain OFDM signal is fed to a signal separation unit 204 which may be configured to separate subcarriers carrying pilot symbols from subcarriers carrying data symbols. The signal separation unit 204 feeds the pilot symbols to a frequency error estimation unit 206 and the data symbols to a demodulation and detection unit 212.

The frequency error estimation unit 206 estimates a frequency offset or frequency error from the received pilot symbols. Since the frequency error estimation unit 206 estimates the frequency error from a frequency-error-corrected OFDM signal, a residual frequency error, i.e. frequency error remaining after the frequency error correction, is actually estimated. The frequency error estimation unit 206 may perform the frequency error estimation either in the time domain or in the frequency domain. The frequency error estimation algorithm utilized by the frequency error estimation unit 206 is described in more detail below. As mentioned above, the frequency error estimation unit 206 outputs frequency error estimates to the frequency error correction unit 200, and the frequency error correction unit 200 adjusts frequency error correction parameters according to the residual frequency error provided by the frequency error estimation unit 206.

As mentioned above, the frequency-error-corrected data symbols are fed to the demodulation and detection unit 212 which demodulates the received data symbols and makes symbol decisions. The symbol decisions may be output to a symbol demapper, decoder, interleaver, or another unit processing the detected symbols.

Figure 3:
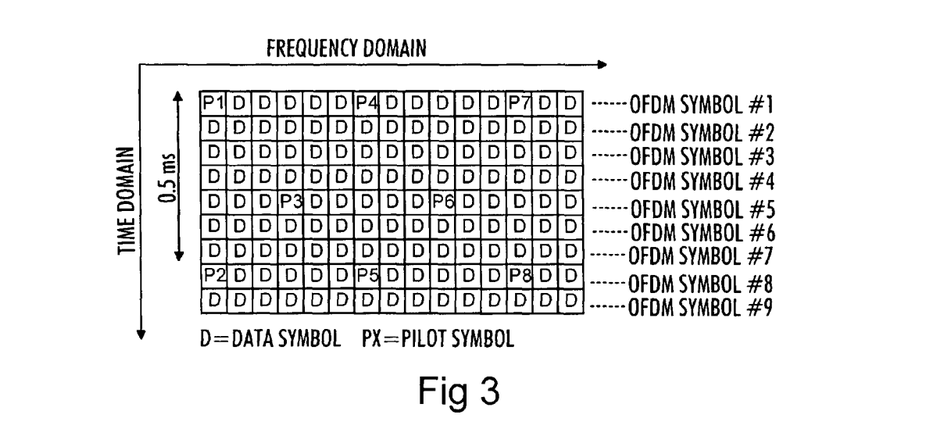
FIG. 3 illustrates an OFDM signal structure for transmission according to the current UMTS LTE specification.

FIG. 3 illustrates a portion of a frame structure according to the current UMTS LTE standard. Each frame comprises a plurality of time slots, and each time slot comprises a plurality of OFDM symbols. An OFDM symbol is a multicarrier signal comprising a plurality of subcarriers, each carrying an information symbol. In FIG. 3, each D represents a data symbol carried by a subcarrier of an OFDM symbol, and P1 to P8 represent pilot symbols. Each row represents an OFDM symbol including a plurality of subcarriers, and FIG. 3 illustrates a total of 9 OFDM symbols (OFDM symbol #1 to OFDM symbol #9). Each column of FIG. 3 represents a subcarrier. Note that only a portion of the subcarriers included in an OFDM symbol is illustrated in FIG. 3.

As can be seen from FIG. 3 and as described in the background section, a pilot symbol is transmitted periodically on the same plurality of subcarriers. For example, pilot symbols P1 and P2 are transmitted on the same subcarrier, and a time interval between the transmissions of the pilot symbols P1 and P2 is 7 OFDM symbols, i.e. 0.5 ms when the duration of one OFDM symbol is 0.071 ms. A pilot symbol P3 is transmitted on a parallel subcarrier at a different time instant than the previously mentioned pilot symbols P1 and P2. A time interval between the transmissions of the pilot symbols P1 and P3 is 4 OFDM symbols, and a time interval between the transmissions of the pilot symbols P3 and P2 is 3 OFDM symbols. Pilot symbols P4 and P5 (and pilot symbols P7 and P8) are transmitted on the same OFDM symbol as P1 and P2, respectively but on parallel subcarriers. A pilot symbol P6 is transmitted on the same OFDM symbol as the pilot symbol P3 but on a parallel subcarrier, and so on.

Figure 4:
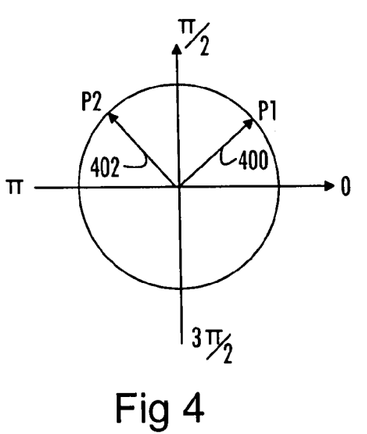
FIG. 4 is a diagram illustrating phases of received pilot symbols used for frequency error estimation.

According to the conventional solution, the frequency error is estimated from a phase difference between subsequent pilot symbols transmitted on the same subcarrier. In other words, the pilot symbols P1 and P2 are used for calculating a first frequency error estimate, P3 and the next pilot symbol transmitted on the same subcarrier (on an OFDM symbol #12 which is not shown) are used for calculating a second frequency error estimate, and so on. The +/−1 kHz range of the conventional scheme results from calculation of a phase difference between two consecutive pilot symbols and from an observation interval (0.5 ms in this case). With reference to a pointer diagram illustrated in FIG. 4, a first pointer 400 represents a phase of the first pilot symbol P1, and a second pointer 402 represents a phase of the second pilot symbol P2. The phase difference is the phase rotation from the first pointer 400 to the second pointer 402. The maximum detectable phase rotation is $\pi$, since the method should also be able to detect, whether the rotation has occurred clockwise or counterclockwise, i.e. whether there is a positive or negative frequency error.

Figure 5:
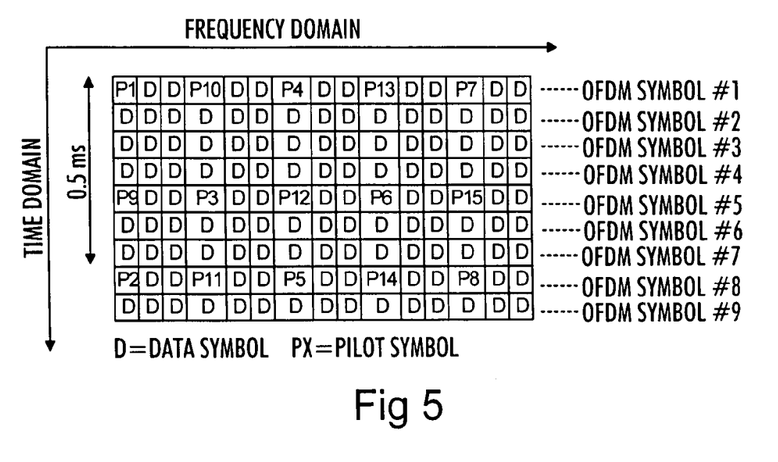
FIG. 5 illustrates the OFDM signal structure with additional interpolated pilot symbols.

FIG. 5 illustrates a solution to enable frequency error estimation according to an embodiment of the invention in case the symbol structure illustrated in FIG. 3 is utilized in transmission. According to this embodiment, additional pilot symbols (pilot subcarriers) are interpolated from pilot symbols transmitted on parallel subcarriers of the same OFDM symbol as the interpolated pilot symbols. In other words, frequency domain interpolation is performed in order to obtain additional pilot symbols. For example, a pilot symbol P9 may be interpolated from two (or more) pilot symbols carried by two (or more) closest subcarriers of the same OFDM symbol #5. One of the pilot symbols used for the interpolation is the pilot symbol P3, and the other is not shown in FIG. 5. Similarly, a pilot symbol P10 is interpolated from at least pilot symbols P1 and P4 transmitted in the same OFDM symbol #1, a pilot symbol P11 is interpolated from the pilot symbols P2 and P5 (OFDM symbol #8), a pilot symbol P12 is interpolated from the pilot symbols P3 and P6 (OFDM symbol #5), etc. Pilot symbols from subcarriers further apart may also be used when interpolating a given pilot symbol.

The interpolation process may utilize linear interpolation or another, more intelligent interpolation. This embodiment is not limited to the type of interpolation. Frequency error properties of parallel subcarriers sufficiently close to one another have high correlation and, therefore, parallel subcarriers may be utilized to bring more information to the frequency error estimation process, thereby improving the accuracy of an estimate calculated from one pilot symbols of a given subcarrier. However, the main point in the interpolation procedure is to create additional pilot symbols to form an irregular time interval between consecutive pilot symbols of the same subcarrier. Referring to FIG. 5, the time interval between the pilot symbols P1 and P9 is 4 OFDM symbols, and the time interval between the pilot symbols P9 and P2 is 3 OFDM symbols. This irregularity in the lengths of the time intervals enables an improvement in the frequency range of the frequency error estimation procedure according to an embodiment of the invention, as will be described next. A similar irregularity in the time intervals between consecutive pilot symbols may be obtained for every subcarrier carrying pilot symbols, as illustrated in FIG. 5.

As mentioned above, the invention is not limited to the interpolation. As an alternative solution, real pilot symbols may be transmitted in the locations of the interpolated pilot symbols in FIG. 5. Transmission of real pilot symbols instead of interpolated pilot symbols further improves the accuracy of the frequency estimation. As long as pilot symbols are transmitted with irregular time intervals, wherein the difference in the lengths of time intervals of different lengths is smaller than the shortest length of the time intervals, the frequency range of the frequency error estimation may be improved. This is explained in more detail below.

Figure 6A:
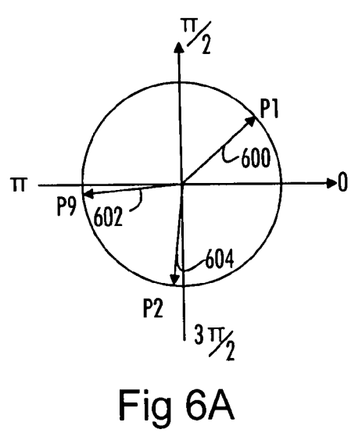
FIGS. 6A, 6B and 6C illustrate phases of pilot symbols used in a frequency error estimation algorithm according to an embodiment of the invention.
Figure 6B:
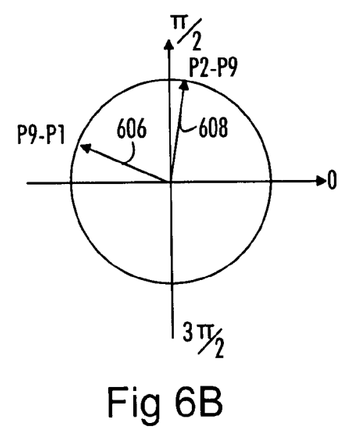
Figure 6C:
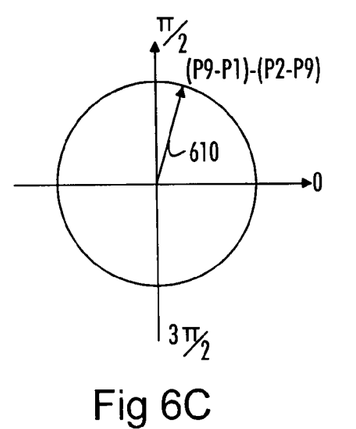

Let us use the example of the pilot symbol structure illustrated in FIG. 5 when describing a frequency error estimation procedure according to an embodiment of the invention. With reference to FIGS. 6A to 6C, let us first describe the estimation procedure for the subcarrier including the pilot symbols P1, P9, and P2. As mentioned above, the frequency error estimation is based on determining a phase rotation of a received signal during a determined time interval. Accordingly, a phase rotation (phase difference) between the pilot symbols P1 and P9 and a phase rotation between the pilot symbols P9 and P2 are estimated. Before the estimation of the phase rotations, absolute phases of the pilot symbols P1, P2, and P9 are determined. The absolute phase may be determined by removing the effect of symbol modulation from a received pilot signal containing the pilot symbol.

FIG. 6A illustrates in a pointer diagram absolute phases of pilot signals associated with the pilot symbols P1, P2, and P9. A first pointer 600 represents the absolute phase of a pilot signal associated with the pilot symbol P1, a second pointer 602 represents the absolute phase of a signal associated with the pilot symbol P9, and a third pointer 604 represents the absolute phase of a signal associated with the pilot symbol P2. Now that the absolute phases are obtained, the phase rotations between the pointers 600 and 602 and between the pointers 602 and 604 are calculated, and the phase differences are illustrated in FIG. 6B. A fourth pointer 606 illustrates the phase rotation between reception of the pilot symbols P9 and P1, i.e. during a time interval of 4 OFDM symbols, and a fifth pointer 608 illustrates the phase rotation between reception of the pilot symbols P2 and P9, i.e. during a time interval of 3 OFDM symbols. Calculation of the frequency error from the fourth pointer 606 by dividing the value of the fourth pointer 606 by the length of the observation time interval (4 OFDM symbols) would result in the frequency range of 1.75 kHz. On the other hand, calculation of the frequency error from the fifth pointer 608 by dividing the value of the fifth pointer 608 by the length of the observation time interval (3 OFDM symbols) would result in the frequency range of 2.33 kHz.

The frequency range may still be improved according to an embodiment of the invention by calculating a phase rotation difference between the fourth pointer 606 and the fifth pointer 608. In practice, this means calculation of the difference between the phase rotation during 4 OFDM symbols and the phase rotation during 3 OFDM symbols and, as a result, a phase rotation during a time interval of 1 OFDM symbol is obtained. As a consequence, the frequency range of the estimator may be improved up to 7 kHz. A sixth pointer 610 illustrated in FIG. 6C represents the phase difference between the fourth pointer 606 and the fifth pointer 608. The actual frequency error estimate may be obtained by dividing the value of the sixth pointer 610 by the observation time interval which in this case is 4−3=1 OFDM symbol interval, i.e. 0.071 ms.

Next, an actual implementation of the frequency error estimation according to an embodiment of the invention will be described. In order to estimate a first phase indicator comprising information on the absolute phase of the first pilot signal carrying the pilot symbol P1, a correlation between the received pilot symbol and a known replica of the pilot symbol transmitted from a transmitter is calculated. The correlation may be calculated according to the following equation:

$$R(n)_i = P(n)_i P_{ref}(n)_i^*, \quad (1)$$

where $R(n)_i$ represents a correlation value, $P(n)_i$ represents a received pilot symbol, $P_{ref}(n)_i$ represents the replica of the transmitted pilot symbol, i is a pilot symbol index, and * denotes a complex conjugate. Since the correlation value $R(n)_i$ as a complex value carries phase information and we are only interested in the phase information, the correlation value is also referred to as a phase indicator in the description. The actual phase may also be calculated by taking an argument of the correlation value but that is not necessary at this stage. Equation (1) may be calculated for every pilot symbol used in the frequency error estimation. As a result, phase indicators of the pilot symbols indicating the phase values illustrated in FIG. 6A are obtained.

Then, the frequency error may be estimated according to the following equation:

$$F = \frac{\arg\left[\left(\sum_{n=0,3,6,...}^{N-1} R(n)_i \cdot R^*(n)_{i+1}\right)\left(\sum_{n=0,3,6,...}^{N-1} R(n)_{i+1} \cdot R^*(n)_{i+2}\right)^*\right]}{2\pi \cdot (a_i - b_i)}, \quad (2)$$

where F represents a frequency error estimate, arg denotes an argument operation (arctan(y/x) where y is an imaginary part and x is a real part of a complex value), i is an OFDM symbol index, $a_i$ denotes a time interval between pilot symbols $P(n)_i$ and $P(n)_{i+1}$, $b_i$ denotes a time interval between pilot symbols $P(n)_{i+1}$ and $P(n)_{i+2}$, n is a subcarrier index, and N represents the total number of subcarriers of the OFDM signal. The reason for the subcarrier index n running as 0, 3, 6, ..., N is the spacing of pilot symbols between the subcarriers (see frequency domain direction in FIG. 5).

Let us study equation (2) in more detail and with reference to the example described above with reference to FIGS. 6B and 6C. Let us at this stage ignore the summations in equation (2), i.e. assume that N=1, for example. As is obvious from equation (2), the frequency error estimation according to the embodiment of the invention is based on calculation of correlations. In order to obtain a first phase rotation indicator comprising information on phase rotation of a received signal within a first time interval, i.e. between the pilot symbols P1 and P9 transmitted on the same subcarrier, correlation between the phase values of the pilot symbols P1 and P9 is calculated. In other words, $R(n)_i \cdot R(n)_{i+1}^*$ is calculated and, as a result, a correlation value containing the phase information represented by the fourth pointer 606 in FIG. 6B is obtained. Therefore, the correlation value thus obtained is referred to as the first phase rotation indicator. In order to obtain a second phase rotation indicator comprising information on phase rotation of a received signal within a second time interval, i.e. between the pilot symbols P9 and P2 on the same subcarrier, correlation between the phase values of the pilot symbols P9 and P2 is calculated. In other words, $R(n)_{i+1} \cdot R(n)_{i+2}^*$ is calculated and, as a result, a correlation value containing the same information represented by the fifth pointer 608 in FIG. 6B is obtained. This correlation value is referred to as the second phase rotation indicator.

Since the summations are omitted in this example, the next operation is to calculate correlation between the first and the second phase rotation indicator, and thereafter, to calculate the argument of that correlation value to obtain the phase rotation difference indicated by the sixth pointer 610 in FIG. 6C. The actual frequency error estimate is then obtained by dividing the phase rotation difference by the difference in the lengths of the first time interval and the second time interval, i.e. division by $2\pi(a_i - b_i)$, wherein $a_i = 4$ and $b_i = 3$ in this example.

The summation in equation (2) indicates summation of a plurality of first phase rotation indicators and summation of a plurality of second phase rotation indicators, wherein each of the plurality of first phase rotation indicators and each of the plurality of second phase rotation indicators is obtained from a different subcarrier, respectively. The plurality of first phase rotation indicators are calculated according to equation (2) from pilot symbols having the same time indices (i and i+1) but different subcarrier indices. Referring to FIG. 5, the plurality of first phase rotation indicators are calculated from the pilot symbols P1 and P9, P10 and P3, P4 and P12, P13 and P6, and P7 and P15. The plurality of first phase rotation values obtained from different subcarriers are then summed, thereby averaging the phase rotation values, reducing variance and improving accuracy of the frequency estimate. Similarly, the plurality of second phase rotation indicators are calculated according to equation (2) from pilot symbols having the same time indices (i+1 and i+2) but different subcarrier indices. Referring to FIG. 5, the plurality of second phase rotation indicators are calculated from the pilot symbols P9 and P2, P3 and P11, P12 and P5, P6 and P14, and P15 and P8. Then, the plurality of second rotation values obtained from different subcarriers are averaged through the summation. After the averaging, the correlation between an averaged first phase rotation indicator and an averaged second phase rotation indicator is calculated.

In a preferred embodiment of the invention, the correlation between phase values of two consecutive pilot symbols (i with i+1 and i+1 with i+2) is calculated according to equation (2). Alternatively, the first phase rotation indicator may be calculated for example between pilot symbols having indices i and i+2 while the second phase rotation indicator may be calculated for example between pilot symbols having indices i+1 and i+3. The preferred embodiment is more robust against fast changes in the frequency error, e.g. rapid changes in the Doppler shift, since the observation time interval is shorter in the preferred embodiment.

The frequency error estimation according to embodiments of the invention may be based on the calculation of correlations, as described above. Alternatively, the absolute phases and the phase differences may be calculated by utilizing trigonometric functions and a CORDIC (Coordinate Rotation Digital Calculation) algorithm, for example. Moreover, received pilot symbols represented as complex values may be converted into a polar representation comprising an amplitude component and a phase component, and the phase differences may be calculated from the phase components of the polar representation.

The frequency error estimation according to embodiments of the invention may also be utilized in diversity reception, e.g. reception with a plurality of antenna elements. An embodiment for utilizing the diversity reception in the frequency error estimation and the correction process is described with reference to FIG. 7. In the described embodiment, the diversity reception is arranged through diversity antenna reception, but other diversity schemes are equally possible. The actual frequency error estimation is carried out by frequency error estimation units 700 and 702 which may have the same structure and functionality as the frequency error estimation unit 206 described above with reference to FIG. 2. The frequency error may be estimated according to the embodiments described above from pilot signals received through the respective diversity branches.

Figure 7:
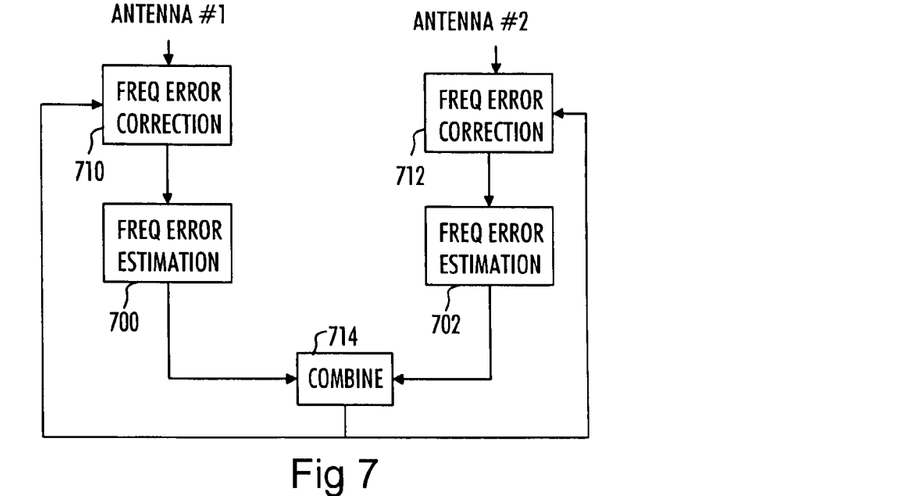
FIG. 7 illustrates an embodiment for utilizing diversity reception in the frequency error estimation.

In the embodiment illustrated in FIG. 7, the frequency error estimates provided by the frequency error estimation units 700 and 702 are combined in a combiner 714 which may be an averaging unit. Accordingly, the combiner 714 may calculate an average value for the respective estimates output from the frequency error estimation units 700 and 702, and output the combined frequency error estimate to frequency error correction units 710 and 712. Then, the frequency error correction units 710 and 712 perform the frequency error correction for OFDM signals received through the respective diversity branches (respective antennas #1 and #2).

Let us now consider a process for estimating the frequency error according to an embodiment of the invention. The process is illustrated as a flow diagram in FIG. 8. The process may be a computer process executed in a processing unit of a receiver (for example receiver 102). The process starts in block 800.

Figure 8:
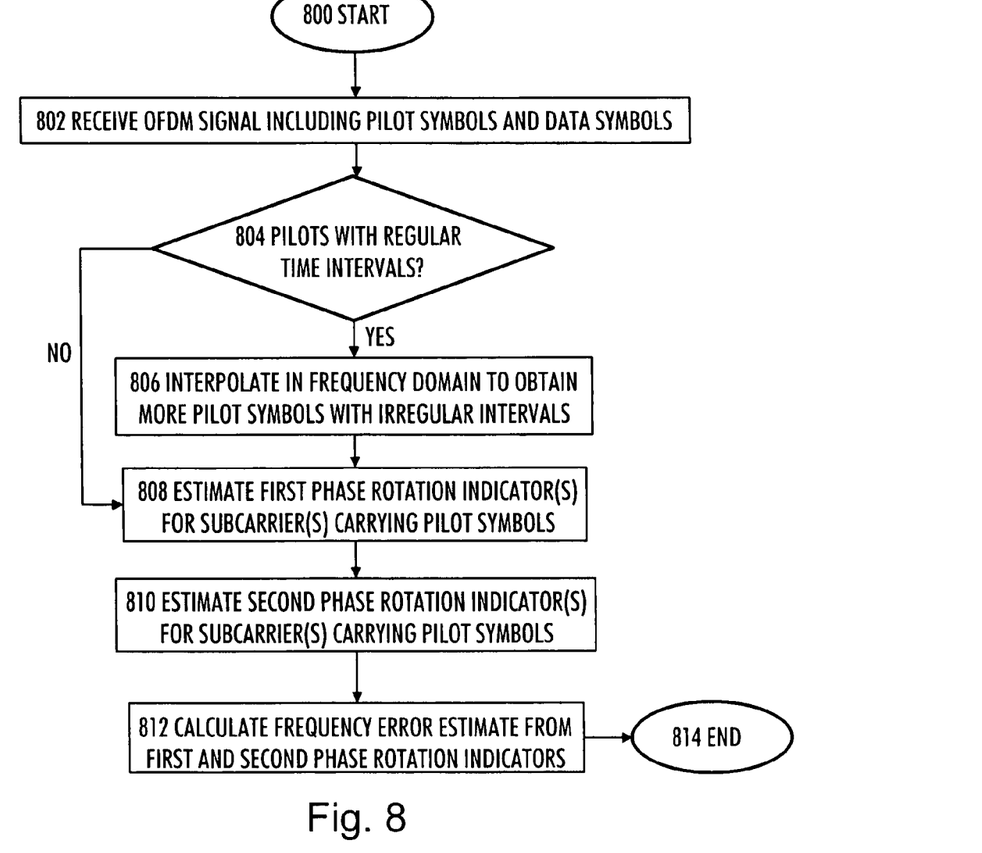
FIG. 8 is a flow diagram illustrating a frequency error estimation process according to an embodiment of the invention.

In block 802, an OFDM signal including pilot symbols and data symbols is received. The OFDM signal may comprise a plurality of OFDM symbols to enable frequency error estimation through estimation of phase rotation during a plurality of OFDM symbols.

In block 804, it is checked whether pilot symbols are located on a subcarrier of the plurality of OFDM symbols with regular (uniform) time intervals. In other words, it is checked whether pilot symbols are transmitted on a given subcarrier with constant time intervals. Information on the regularity of the transmission of the pilot symbols may be defined in a communication protocol, or the information may be known beforehand in another way. If the pilot symbols are transmitted on the subcarriers with regular time intervals, the process advances to block 806 in which more pilot symbols (pilot subcarriers) are interpolated from the transmitted pilot symbols to obtain more pilot symbols and to arrange irregular time intervals between consecutive pilot symbols of a given subcarrier. The interpolation may be a frequency domain interpolation in the sense that an interpolated pilot symbol is interpolated from at least two pilot symbols received on at least two parallel frequencies at the time instant associated with the interpolated pilot symbol. In practice, the interpolated pilot symbol is interpolated from two or more pilot symbols transmitted on parallel subcarriers of the same OFDM symbol.

If it is determined in block 804 that the pilot symbols are transmitted with irregular time intervals, the process moves from block 804 to block 808 in which a plurality of first phase rotation indicators are calculated from the received pilot symbols. In case the process moved to block 808 through block 806, interpolated pilot symbols are also used in the estimation of the first phase rotation indicators. Each of the plurality of the first phase rotation indicators is estimated by calculating a metric comprising information on a phase difference between two pilot symbols located on the same subcarrier and different OFDM symbols, wherein the time interval between the OFDM symbols is a first time interval. The metric may be a correlation value or a phase value, for example. After the estimation of the first phase rotation indicators, the first phase rotation indicators may be summed or averaged in block 808.

Then, the process moves to block 810 in which a plurality of second phase rotation indicators are calculated from the received pilot symbols. In case block 806 has been executed, interpolated pilot symbols are also used in the estimation of the second phase rotation indicators. Similar to the execution of block 808, each of the plurality of the second phase rotation indicators is estimated by calculating metric comprising information on a phase difference between two pilot symbols located on the same subcarrier and different OFDM symbols, wherein the time interval between the OFDM symbols is a second time interval. The metric may be a correlation value or a phase value, for example. Preferably, the timing of the first time interval occurs before the timing of the second time interval, and the first and the second time interval have different lengths. After the estimation of the second phase rotation indicators, the second phase rotation indicators may be summed or averaged in block 810.

Then, the process moves to block 812 in which a frequency error estimate is calculated from the first and the second averaged phase rotation indicators. The frequency error may be estimated by calculating a phase difference between the first and the second averaged phase rotation indicator and dividing the phase difference by a difference in the lengths of the first and the second time interval. The frequency error estimation process ends in block 814, and the estimated frequency error may then be corrected from the received data symbols to facilitate subsequent demodulation and detection processes.

As mentioned above, the frequency error estimation process according to embodiments of the invention may be carried out as a computer process in the processing unit of the receiver. The computer process may be defined by a computer program executed in the processing unit. The computer program may be stored on a computer program distribution medium readable by the processing unit. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method, comprising:
providing a received signal comprising a plurality of pilot symbols transmitted with irregular time intervals between consecutive pilot symbols, wherein the irregular time intervals comprise a first time interval and a second time interval of a different length than the first time interval;
estimating, by a processor, from pilot symbols related to the first time interval, a first phase rotation indicator comprising information on phase rotation of the received signal within the first time interval;
estimating from pilot symbols related to the second time interval, a second phase rotation indicator comprising information on phase rotation of the received signal within the second time interval; and
calculating a frequency error estimate from a phase difference between the first phase rotation indicator and the second phase rotation indicator and from the length difference between the first time interval and the second time interval.

2. The method of claim 1, wherein the difference between the lengths of the first time interval and the second time interval is smaller than either the length of the first time interval or the length of the second time interval.

3. The method of claim 1, the calculation of the frequency error estimate further comprising:
calculating a phase difference between the first phase rotation indicator and the second phase rotation indicator; and
dividing the calculated phase difference by a difference between the lengths of the first time interval and the second time interval.

4. The method of claim 1, the estimation of a phase rotation indicator further comprising:
calculating a first phase indicator comprising information on an absolute phase of a first signal received at a first time instant;
calculating a second phase indicator comprising information on an absolute phase of a second signal received at a second time instant; and
calculating the phase rotation indicator from the difference between the first phase indicator and the second phase indicator.

5. The method of claim 1, further comprising:
estimating the first phase rotation indicator from a difference between a first pilot symbol and a second pilot symbol received at different time instants, wherein the duration between the time instants defines the length of the first time interval; and
estimating the second phase rotation indicator from a difference between a third pilot symbol and a fourth pilot symbol received at different time instants, wherein the duration between the time instants defines the length of the second time interval.

6. The method of claim 5, further comprising:
receiving the pilot symbols in the following order: first pilot symbol, second pilot symbol, third pilot symbol, fourth pilot symbol.

7. The method of claim 5, wherein the second pilot symbol and the third pilot symbol are the same pilot symbol.

8. The method of claim 5, further comprising:
receiving the first pilot symbol, second pilot symbol, third pilot symbol, and fourth pilot symbol on the same frequency.

9. The method of claim 5, wherein at least one of the first pilot symbol, second pilot symbol, third pilot symbol, and fourth pilot symbol is interpolated from at least two pilot symbols received on at least two parallel frequencies at the time instant associated with the interpolated pilot symbol.

10. The method of claim 1, further comprising:
calculating correlation between each received pilot symbol and a known replica of a transmitted pilot symbol, thereby obtaining correlation values containing information on the absolute phase values of the received pilot symbols;
calculating correlation between the correlation values of a first pilot symbol and a second pilot symbol to obtain the first phase rotation indicator; and
calculating correlation between the correlation values of a third pilot symbol and a fourth pilot symbol to obtain the second phase rotation indicator.

11. The method of claim 10, further comprising:
calculating correlation between the first phase rotation indicator and the second phase rotation indicator;
calculating an argument of the correlation between the first phase rotation indicator and the second phase rotation indicator to obtain the phase difference between the first phase rotation indicator and the second phase rotation indicator; and
dividing the calculated phase difference by the difference between the lengths of the first time interval and the second time interval.

12. The method of claim 1, further comprising:
estimating a plurality of first phase rotation indicators describing the phase rotation of the received signal within the first time interval, wherein each of the plurality of first phase rotation indicators is associated with a different frequency;
estimating a plurality of second phase rotation indicators describing the phase rotation of the received signal within the second time interval, wherein each of the plurality of second phase rotation indicators is associated with a different frequency;

summing the plurality of first phase rotation indicators to obtain a first summed phase rotation indicator;
summing the plurality of second phase rotation indicators to obtain a second summed phase rotation indicator; and
calculating a frequency error estimate from a phase difference between the first summed phase rotation indicator and the second summed phase rotation indicator.

13. The method of claim 1, further comprising:
correcting the frequency error estimate from the received signal.

14. The method of claim 13, further comprising:
correcting the frequency error from the received signal before the frequency error estimation; and
estimating a residual frequency error from the frequency-error-corrected signal.

15. An apparatus, comprising:
a processor; and
a memory including computer program code,
the memory and the computer program code configured to, with the processor, cause the apparatus at least to
receive a signal,
estimate a first phase rotation indicator comprising information on phase rotation of the received signal within a first time interval,
estimate a second phase rotation indicator comprising information on phase rotation of the received signal within a second time interval of a different length than the first time interval, and
calculate a frequency error estimate from a phase difference between the first phase rotation indicator and the second phase rotation indicator.

16. The apparatus of claim 15, wherein the difference between the lengths of the first time interval and the second time interval is smaller than either the length of either the first time interval or the length of the second time interval.

17. The apparatus of claim 15, wherein the memory and the computer program code are further configured to, with the processor, cause the apparatus at least to calculate a phase difference between the first phase rotation indicator and the second phase rotation indicator and to divide the calculated phase difference by a difference between the lengths of the first time interval and the second time interval.

18. The apparatus of claim 15, wherein the memory and the computer program code are further configured to, with the processor, cause the apparatus at least to estimate a phase rotation indicator by calculating a first phase indicator comprising information on the absolute phase of a first signal received at a first time instant, calculating a second phase indicator comprising information on the absolute phase of a second signal received at a second time instant, and calculating the phase rotation indicator from the phase difference between the first phase indicator and the second phase indicator.

19. The apparatus of claim 15, wherein the memory and the computer program code are further configured to, with the processor, cause the apparatus at least to estimate the first phase rotation indicator from a difference between a first pilot symbol and a second pilot symbol received at different time instants, wherein a duration between the time instants defines the length of the first time interval, and to estimate the second phase rotation indicator from a difference between a third pilot symbol and a fourth pilot symbol received at different time instants, wherein the duration between the time instants defines a length of the second time interval.

20. The apparatus of claim 19, wherein the reception order of the pilot symbols is: first pilot symbol, second pilot symbol, third pilot symbol, fourth pilot symbol.

21. The apparatus of claim 19, wherein the second pilot symbol and the third pilot symbol are the same pilot symbol.

22. The apparatus of claim 19, wherein the memory and the computer program code are further configured to, with the processor, cause the apparatus at least to calculate the first phase rotation indicator and the second phase rotation indicator from pilot symbols received on the same frequency.

23. The apparatus of claim 19, wherein the memory and the computer program code are further configured to, with the processor, cause the apparatus at least to interpolate at least one of the first pilot symbol, second pilot symbol, third pilot symbol, and fourth pilot symbol from at least two pilot symbols received on at least two parallel frequencies at the time instant associated with the interpolated pilot symbol.

24. The apparatus of claim 15, wherein the memory and the computer program code are further configured to, with the processor, cause the apparatus at least to calculate correlation between each received pilot symbol and a known replica of a transmitted pilot symbol, thereby obtaining correlation values containing information on the absolute phase values of the received pilot symbols, to calculate correlation between the correlation values of the first pilot symbol and the second pilot symbol to obtain the first phase rotation indicator, and to calculate correlation between the correlation values of the third pilot symbol and the fourth pilot symbol to obtain the second phase rotation indicator.

25. The apparatus of claim 24, wherein the memory and the computer program code are further configured to, with the processor, cause the apparatus at least to calculate correlation between the first phase rotation indicator and the second phase rotation indicator, to calculate an argument of the correlation between the first phase rotation indicator and the second phase rotation indicator to obtain the phase difference between the first phase rotation indicator and the second phase rotation indicator, and to divide the calculated phase difference by the difference between the lengths of the first time interval and the second time interval.

26. The apparatus of claim 15, wherein the memory and the computer program code are further configured to, with the processor, cause the apparatus at least to estimate a plurality of first phase rotation indicators describing the phase rotation of the received signal within the first time interval, wherein each of the plurality of first phase rotation indicators is associated with a different frequency, to estimate a plurality of second phase rotation indicators describing the phase rotation of the received signal within the second time interval, wherein each of the plurality of phase rotation indicators is associated with a different frequency, to sum the first phase rotation indicators to obtain a first summed phase rotation indicator, to sum the second phase rotation indicators to obtain a second summed phase rotation indicator, and to calculate the frequency error estimate from the phase difference between the first summed phase rotation indicator and the second summed phase rotation indicator.

27. The apparatus of claim 15, wherein the memory and the computer program code are further configured to, with the processor, cause the apparatus at least to correct the estimated frequency error from the received signal.

28. The apparatus of claim 27, wherein the memory and the computer program code are further configured to, with the processor, cause the apparatus at least to correct the frequency error from the received signal before the frequency error is estimated and to estimate a residual frequency error from the frequency-error-corrected signal.

29. A receiver, comprising:
an interface configured to receive a signal comprising a plurality of pilot symbols transmitted with irregular time intervals between consecutive pilot symbols, wherein the irregular time intervals comprise a first time interval and a second time interval of a different length than the first time interval; and a processor configured to estimate from pilot symbols related to the first time interval a first phase rotation indicator comprising information on phase rotation of the received signal within the first time interval, to estimate from pilot symbols related to the second time interval a second phase rotation indicator comprising information on phase rotation of the received signal within the second time interval, and to calculate a frequency error estimate from a phase difference between the first phase rotation indicator and the second phase rotation indicator and from the length difference between the first time interval and the second time interval.

30. An apparatus, comprising:

means for providing a received signal comprising a plurality of pilot symbols transmitted with irregular time intervals between consecutive pilot symbols, wherein the irregular time intervals comprise a first time interval and a second time interval of a different length than the first time interval;

means for estimating from pilot symbols related to the first time interval a first phase rotation indicator comprising information on phase rotation of the received signal within the first time interval;

means for estimating from pilot symbols related to the second time interval a second phase rotation indicator comprising information on phase rotation of the received signal within the second time interval; and means for calculating a frequency error estimate from a phase difference between the first phase rotation indicator and the second phase rotation indicator and from the length difference between the first time interval and the second time interval.

31. A non-transitory computer readable medium encoded with a computer program of instructions for executing a computer process for frequency error estimation, the process comprising:

providing a received signal comprising a plurality of pilot symbols transmitted with irregular time intervals between consecutive pilot symbols, wherein the irregular time intervals comprise a first time interval and a second time interval of a different length than the first time interval;

estimating from pilot symbols related to the first time interval a first phase rotation indicator comprising information on phase rotation of the received signal within the first time interval;

estimating from pilot symbols related to the second time interval a second phase rotation indicator comprising information on phase rotation of the received signal within the second time interval; and calculating a frequency error estimate from a phase difference between the first phase rotation indicator and the second phase rotation indicator and from the length difference between the first time interval and the second time interval.

\* \* \* \* \*